(No Model.)
J. W. BLACKWELL.
SPOON.
No. 468,592. Patented Feb. 9, 1892.
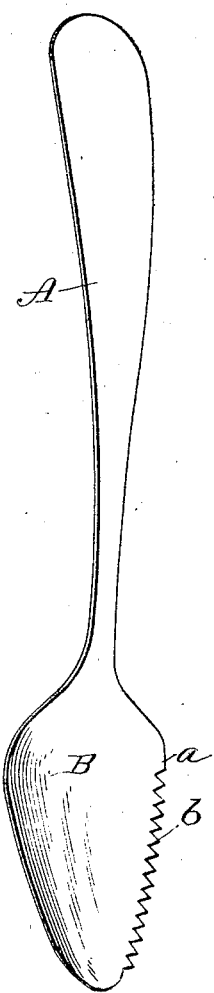
Attest
Walter Donaldson
F. L. Middleton
Inventor
John W. Blackwell
by Ellis Spear
Atty.

United States Patent Office.

JOHN W. BLACKWELL, OF NORTH ATTLEBOROUGH, MASSACHUSETTS, ASSIGNOR TO F. M. WHITING & CO., OF SAME PLACE.

SPOON.

SPECIFICATION forming part of Letters Patent No. 468,592, dated February 9, 1892.

Application filed April 9, 1891. Renewed January 14, 1892. Serial No. 418,005. (No model.)

*To all whom it may concern:*

Be it known that I, JOHN W. BLACKWELL, a citizen of the United States of America, residing at North Attleborough, in the county of Bristol and State of Massachusetts, have invented certain new and useful Improvements in Spoons, of which the following is a specification.

My invention is an improved spoon, and it is intended for use in connection with oranges or other fruit where it is necessary to sever the fibers or for use where the ordinary edge of the spoon is not sufficient to divide the food to be eaten.

My invention consists of a spoon of approximately ordinary shape, having one of its sides serrated or provided with teeth.

In the accompanying drawing I have represented my improved spoon in perspective.

A represents the handle of the spoon, which may be ornamented in any suitable manner and of any suitable shape, as my invention has no reference to this part of the spoon, relating solely to the bowl. The bowl portion shown at B has one of its sides $a$ formed approximately straight, and its edge is serrated or toothed, as shown at $b$. In all other respects the spoon may be of ordinary construction. This line of serrations or teeth provides for the easy separation or division of the fruit or other food, and especially in case of such fruit, as oranges, where it is necessary to divide the fibers of the material.

What I claim is—

The described spoon having its bowl formed with a serrated or toothed edge, substantially as described.

In testimony whereof I affix my signature in presence of two witnesses.

JOHN W. BLACKWELL.

Witnesses:
   JOS. E. POND,
   W. H. POND.